United States Patent [19]

Dehne

[11] 4,398,932
[45] Aug. 16, 1983

[54] PARTICULATE SEPARATION DEVICE

[76] Inventor: Manfred F. Dehne, 14350 Chrisman Rd., Houston, Tex. 77039

[21] Appl. No.: 363,448

[22] Filed: Mar. 30, 1982

Related U.S. Application Data

[63] Continuation of Ser. No. 223,788, Jan. 9, 1981, abandoned.

[51] Int. Cl.$^3$ .................. B01D 45/12; B04C 5/26
[52] U.S. Cl. ....................... 55/349; 55/343; 55/432; 55/435; 55/267; 209/144
[58] Field of Search ............... 55/344, 346, 347–349, 55/432, 466, 343, 435, 267; 209/144; 210/512.2; 285/133 R, DIG. 6

[56] References Cited

U.S. PATENT DOCUMENTS

| | | |
|---|---|---|
| 1,333,325 | 3/1920 | McGee . |
| 2,391,863 | 2/1946 | Bowen . |
| 2,553,175 | 5/1951 | Davenport et al. . |
| 2,761,526 | 9/1956 | Kemmetmuller . |
| 2,917,131 | 9/1959 | Evans . |
| 2,976,130 | 3/1961 | Hedberg et al. ............... 55/348 |
| 3,365,058 | 1/1968 | Petersen . |
| 3,503,503 | 3/1970 | Ramond . |
| 3,541,766 | 11/1970 | Wilson . |
| 3,631,657 | 1/1972 | Wilson . |
| 3,638,400 | 2/1972 | Heilmann . |
| 3,646,595 | 2/1972 | Williams . |
| 3,720,314 | 3/1973 | Phillippi . |
| 3,747,306 | 7/1973 | Wikdahl . |
| 3,813,853 | 6/1974 | Anderson . |
| 3,853,518 | 12/1974 | Tu et al. . |
| 3,885,933 | 5/1975 | Putney . |
| 3,925,045 | 12/1975 | Cheng . |
| 3,951,629 | 4/1976 | Kalen . |
| 3,960,734 | 6/1976 | Zagorski . |
| 3,982,902 | 9/1976 | Lortz . |
| 4,043,775 | 8/1977 | Solomon . |
| 4,279,624 | 7/1981 | Wilson ............... 209/144 |
| 4,285,706 | 8/1981 | Dehne ............... 55/349 |

FOREIGN PATENT DOCUMENTS

| | | |
|---|---|---|
| 1922497 | 11/1970 | Fed. Rep. of Germany ... 285/133 R |
| 683806 | 9/1979 | U.S.S.R. ............... 55/348 |

Primary Examiner—David L. Lacey
Attorney, Agent, or Firm—Carwell & Helmreich

[57] ABSTRACT

A particulate separation device having a particulate outlet structure for transporting particulate from a particulate-laden gas chamber to a main housing particulate outlet so as not to pass through individual cyclone separator units in said separation device.

14 Claims, 3 Drawing Figures

PARTICULATE SEPARATION DEVICE

This is a continuation of application Ser. No. 223,788, filed Jan. 9, 1981, now abandoned.

TECHNICAL FIELD

This invention relates to devices for the separation of solid particulates from gases in high-temperature, high-pressure environments.

PRIOR ART

Removal of particulates in a high-temperature, high-pressure environment is needed to many industrial applications such as conventional power generators utilizing solid fuels and catalytic cracking processes for the production of petroleum products. One example of a multiple cyclone separator system is disclosed in the inventor's previously filed application Ser. No. 022,284, filed Mar. 10, 1979, for a Particulate Filtration Device now U.S. Pat. No. 4,285,706. As disclosed in this patent application, where the flow of particulate-laden gas is at high temperature, high pressure and high volume, the basic particle separation system is a plurality of cyclone separator units. Due to the vigorous conditions of flow including both high temperature and high pressure, the multiple cyclone system of United States patent application Ser. No. 022,284 effectively provides support for such separator units in spite of the potentially severe stresses being placed upon the structure.

In U.S. patent application Ser. No. 022,284, now U.S. Pat. No. 4,285,706, and in other such multiple cyclone systems, the basic design of the system includes a particulate-laden gas chamber, a particulate chamber and a clean gas chamber mounted inside a main vessel housing. In the particular design of the particulate filtration device of U.S. patent application Ser. No. 022,284, where a unique structural relationship between the various chambers and cyclone separators is illustrated, the individual separator units are mounted in the main vessel housing, having inlets in the particulate-laden gas chamber and the appropriate outlets in fluid communication with the particulate and clean gas chambers.

In the arrangement of U.S. patent application Ser. No. 022,284, the particulate suspended in the gas entering into the particulate-laden gas chamber will enter into the individual separator unit inlets, be separated from the gas and exit through the particulate chamber. However, some of the heavier particulate, and surges of large quantities of particulate functioning as a fluid mass rather than as suspended particles, may tend to bypass the separator unit inlets and settle at the lowermost portion of the particulate-laden gas chamber. Bits of debris will occasionally also enter with the particulate-laden gas and bypass the separator units to settle in the bottom of the particulate-laden gas chamber.

As the amount of particulate and debris in the particulate-laden gas chamber mounts in a multiple cyclone separator system, it becomes necessary to remove the accumulation before it interferes with the operation of the separator units. Removal may be accomplished by entering the particulate-laden gas chamber through an access hatch and removing the built up particulate and debris directly out of the vessel from the particulate-laden gas chamber. Another method of removal of debris involves opening a passageway between the particulate-laden gas chamber and the paticulate chamber thereby causing built up particulate and debris to exit through the particulate chamber outlet. Either method has the undesirable effect of causing periodic shutdown of the system with the normal problems attending a shutdown and startup cycle.

With respect to the systems allowing for the removal of debris, U.S. Pat. Nos. 2,553,175 and 1,333,325 both illustrate separator systems, which although structurally inadequate for high pressure and temperature operation, provide for periodic removal of accumulations of particulate, and debris. U.S. Pat. Nos. 2,553,175 and 1,333,325 disclose separator systems that are substantially different from the system of U.S. patent application Ser. No. 022,284 in many ways. With respect to the problem of removal of accumulated debris, such debris falls to the bottom of the main vessel of the systems of these patents and temporarily accumulates there as compared to accumulation in the particulate-laden chamber in U.S. patent application Ser. No. 022,284, now U.S. Pat. No. 4,285,706. However, even in the designs disclosed in these patents, the problem of at least temporary accumulation of heavy particles and debris is present, assuming the designs would be theoretically operable, and such accumulations cannot be removed without at least temporarily affecting the entire system.

One solution of this problem is disclosed in the simultaneously filed patent application of the present inventor Ser. No. 223,801 now U.S. Pat. No. 4,348,215 in which a generally cylindrical particulate-laden gas structure and a generally cylindrical clean gas structure are mounted adjacent to each other in a main vessel and a particulate transfer means is provided for transporting otherwise accumulated particulate and debris, which falls to the bottom of the particulate-laden gas chamber, from the particulate-laden gas chamber to a second main vessel housing particulate outlet. This invention herein is directed to the substantial elimination of the same problem for another configuration of a particulate removal system.

SUMMARY OF INVENTION

A particulate separation device has a main vessel housing forming a main housing chamber, and including a particulate-laden gas inlet, a clean gas outlet and a particulate outlet. A generally cylindrical clean gas structure is mounted substantially longitudinally within the main housing chamber with an outlet in fluid communication with the main vessel housing clean gas outlet. A generally annular particulate-laden gas structure is mounted substantially longitudinally within the main housing chamber and around the clean gas structure with an inlet in fluid communication with the main vessel housing particulate-laden gas inlet.

A separator assembly including a plurality of individual separator units each with an inlet in fluid communication with the particulate-laden gas structure, a clean gas outlet in fluid communication with the clean gas structure and a particulate outlet in fluid communication with the main housing chamber, is mounted in the main housing chamber. The particulate-laden gas structure and the clean gas structure provide means for mounting the separator units in a circumferentially vertically stacked arrangement.

The improvement comprises a particulate outlet means mounted in the main vessel chamber for transporting from the particulate-laden gas structure to the main vessel housing particulate outlet, particulate and debris separated from the particulate-laden gas.

DESCRIPTION OF THE PREFERRED EMBODIMENT

Figure 1:
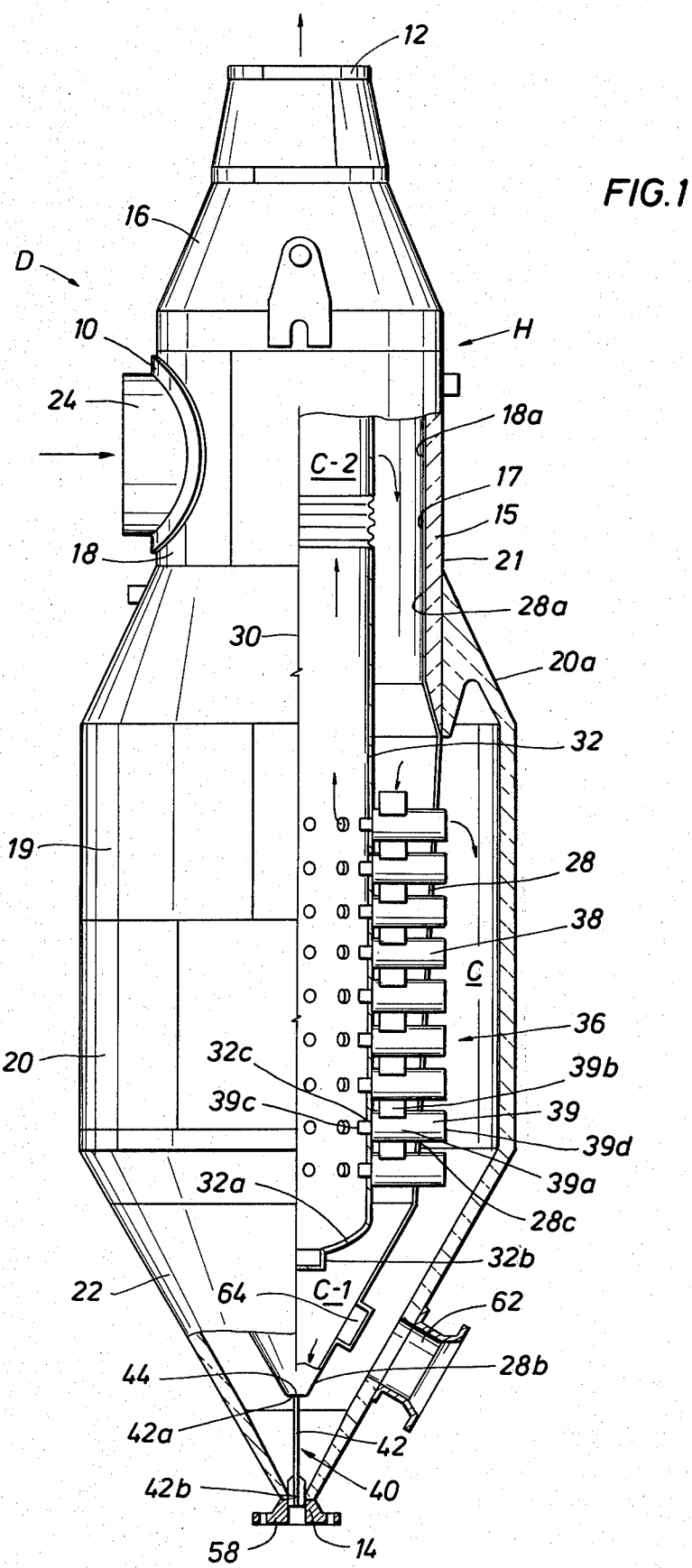
FIG. 1 is a side view in partial cross section of the improved particulate filtration device.

Referring to the drawings, FIG. 1 shows a side view in partial cross section of the improved particulate filtration device D of the present invention including the generally cylindrical main vessel housing H which forms a main housing chamber C. The main vessel housing H has a particulate-laden gas inlet 10 adapted to receive particulate-laden gas, a clean gas outlet 12 to transfer cleaned gas outwardly of the main vessel housing H and a particulate outlet 14 to transfer particulate outwardly of the main vessel housing H.

The main housing H is formed of a substantially frusto-conical shaped top portion 16, a cylindrical entry portion 18, a generally cylindrical main portion 20 including frusto-conical portion 20a, and an inverted frusto-conical shaped bottom portion 22. The main vessel housing particulate-laden gas inlet 10 is formed in the entry portion 18 and has welded to it a connecting cylinder 24 adapted to be joined to a source of particulate-laden gas. The entry portion 18 has a cylindrical interior wall 18a adapted to initially impart a vortical flow to the entering particulate-laden gas, due to the relationship between the gas inlet 10 and the interior wall 18a.

The main vessel housing H and the other structures of this invention are constructed of material suitable for the high-temperature, high-pressure environment. The outer surface 21 of main vessel housing H is formed of individual plates 19, welded together. The inner surface 17 of main vessel housing H is formed of a material resistant to wear from the particulate. Thermal insulation material 15 is placed between the inner surface 17 and the outer surface 21.

The particulate-laden gas inlet 10 is in fluid communication with a generally cylindrical particulate-laden gas receiving structure or housing member 28 mounted within the main housing vessel H and depending from the frusto-conical portion 20a substantially longitudinally in relation to axis 30 of the main housing chamber C. The particulate-laden gas receiving structure 28 has an inlet portion 28a at a first or top end which is attached to inlet interior wall section 18a and is therefore in fluid communication with main vessel housing particulate-laden gas inlet 10. A generally annular particulate-laden gas chamber C-1 is formed within particulate-laden gas structure 28. The longitudinal axis of the particulate-laden gas receiving structure 28 substantially coincides with the main housing chamber axis 30.

The particulate-laden gas structure 28 is mounted concentrically about a generally cylindrical clean gas structure 32, also mounted within the main housing chamber C with its longitudinal axis substantially coinciding with the main housing chamber axis 30. The clean gas structure 32 is attached to the main vessel housing at clean gas outlet 12. The bottom end 32a of the clean gas structure is closed by access hatch 32b. Clean gas chamber C-2 is formed in clean gas structure 32.

Separation of particulate from particulate-laden gas is performed by the separator assembly 36 which includes a plurality of individual cyclone separator units 38 which are of conventional design or the unique design of U.S. Pat. No. 3,802,570. The separator units 38 are mounted within the main housing chamber C by the particulate-laden gas structure 28 and the clean gas structure 32 in a circumferential vertically stacked arrangement as shown in FIG. 1.

A typical separator unit 39 has a main body 39a, a particulate-laden gas inlet 39b, a clean gas outlet 39c and a particulate outlet 39d. The separator units 38 are mounted by their main body through openings 28c formed in particulate-laden gas structure 28 and by their clean gas outlet through openings 32c formed in clean gas structure 32, thereby providing fluid communication with the clean gas chamber C-2 and the particulate chamber C-1. Particulate-laden gas within particulate-laden gas chamber C-1 enters the separator unit main body 39a through the particulate-laden gas inlet 39b, is swirled towards the particulate outlet 39d separating the entering mixture into cleaned gas and particulate. The particulate exits through the particulate outlet 39d into a particulate or main housing chamber C. The cleaned gas exits through the clean gas outlet 39c into clean gas chamber C-2 flows upwardly and outwardly of the housing H. Particulate in particulate chamber C drops to bottom portion 22 and exits outwardly of the main vessel housing H through particulate outlet 14.

A particulate outlet means 40 is mounted in the main housing chamber C for transporting from particulate-laden gas structure 28 to the main vessel housing particulate outlet 14 particulate and debris separated from the particulate-laden gas prior to entry of the gas into the separator units 38. Particulate outlet means 40 includes a generally tubular member or conduit 42 with a first opened end 42a and a second opened end 42b. The first opened end 42a is attached to particulate-laden gas structure outlet 44 formed in the lower or other end 28b of the particulate-laden gas structure. The tubular member second end 42b is located substantially within the main vessel housing particulate outlet 14.

Particulate or debris which enters the particulate-laden gas structure 28 which for any reason does not enter into the separator unit inlets 39b will move to the second end 28b of the particulate-laden gas structure 28 where the particulate debris and a portion of the gas will exit through outlet 44 into tubular member first end 42a. This particulate and debris which some gas will exit from tubular member second end 42b into particulate outlet 14 and be transported outwardly of the main vessel housing H prior to entry of the gas into the separator units 38. Thereby, a buildup of particulate and debris in the particulate-laden gas structure 28 is avoided.

A pressure differential between the inlet 39b and the outlets 39c and 39d of a separator unit is necessary for the operation of cyclone separators. Therefore, the pressure in particulate-laden gas chamber C-1 must be higher than the pressure in the particulate chamber C. The particulate outlet means 40 is designed to allow transportation of particulate from the particulate-laden gas structure 28 to the particulate outlet 14 without destroying the necessary pressure differential.

Figure 2:
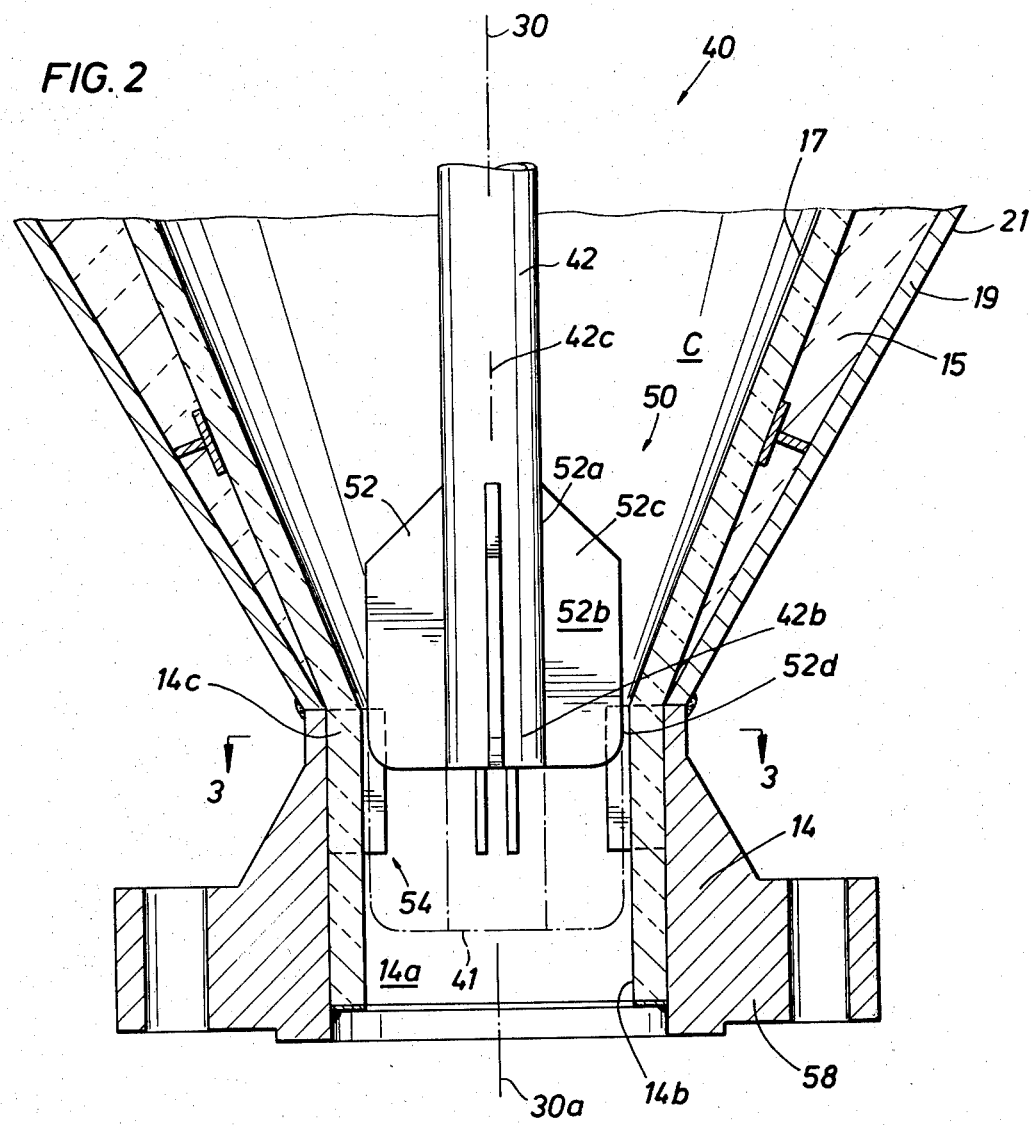
FIG. 2 is a side cross-sectional view of the main vessel housing particulate outlet and one end of the particulate outlet means.
Figure 3:
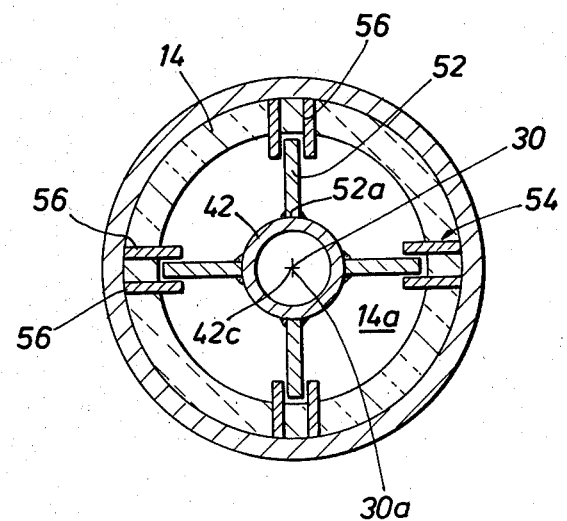
FIG. 3 is a top cross-sectional view of the main vessel housing particulate outlet and the particulate outlet means taken along line 3—3 of FIG. 2.

As seen in FIG. 2, the tubular member second end 42b extends within the cylindrical opening area or chamber 14a formed by particulate outlet 14 of the vessel housing H. This positioning reduces the flow area available for particulate and gases exiting through particulate outlet 14 thereby increasing flow velocity and creating a Venturi effect in outlet chamber 14a. As particulate and gases exit from the outlet 14 at an increased velocity, the pressure in outlet chamber 14a is reduced which causes the particulate, debris, and gas in tubular member 42 to flow with the particulate out particulate outlet 14 rather than into the main vessel chamber C which would disrupt the necessary pressure differential between chambers C and C-1. Were tubular member 42 to be blocked by a surge of particulate, the Venturi effect would help draw the particulate out of tubular member 42 and restore the desired flow.

Correct positioning of tubular member second end 42b within the particulate outlet chamber 14a is caused by positioning means 50 mounted with the tubular member second end 42b. The positioning means 50 includes blades or fins 52 which are generally rectangular in configuration and have a first edge 52a attached by welding or otherwise to the tubular member 42 so that the blades 52 extend radially from and longitudinally along tubular member 42. In the preferred embodiment, four such blades 52 are mounted circumferentially, spaced 90° apart. Specifically, each blade 52 has a rectangular main body 52b and a triangular upper portion 52c. The lower outer corner 52d is rounded to facilitate any motion caused by dislocation within the particulate outlet chamber 14a.

The pressure and temperature changes to which the particulate filtration device D will be subjected will cause motion of the tubular member second end 42b in relation to the particulate outlet 14. The positioning blades 52 will cause axis 42c of tubular member 42 to stay substantially coincidental with the axis 30a of the particulate outlet 14 which is coincidental with axis 30 of the main housing chamber C. As main vessel housing H and particulate-laden gas structure 28 react to expansion and contraction, the location of second end 42b in chamber 14a will change as indicated by dotted lines 41. Because there are no structural connections between the particulate outlet 14 and particulate outlet means 40, other than the mounting of particulate-laden gas structure 28, there is no stress placed on the particulate filtration device D by this change.

Guide means 54 are mounted with the particulate outlet cylindrical inside wall 14b to allow guided longitudinal and radial or transverse displacement of tubular member 42 within the particulate outlet 14. Guide means 54 includes guide rails 56 which are mounted in the wall 14b of particulate outlet 14 and extend from the wall 14b into the particulate outlet chamber 14a with a guide space therebetween to receive the blades 52. Each blade 52 will be located between a pair of rails 56. This will guide the tubular member 42 in any longitudinal movement caused by pressure and temperature changes.

The particulate filtration device D is mounted to a particulate receiving vessel or other system by flange 58. Access to the interior of the housing H is provided by outer manway 62 and access to particulate-laden gas structure 28 is provided by inner manway 64.

The foregoing disclosure and description of the invention are illustrative and explanatory thereof and various changes in the size, shape and materials as well as the details of the illustrated construction may be made without departing from the spirit of the invention.

We claim:

1. In a particulate separation device, including an inner clean gas housing comprising an inner clean gas chamber, an intermediate particulate-laden housing comprising an intermediate particulate-laden gas chamber between said intermediate housing and said inner housing, an outer particulate housing comprising an outer particulate chamber between said outer housing and said intermediate housing, a particulate-laden gas inlet adapted to receive a particulate-laden gas and in fluid communication with said intermediate chamber, a clean gas outlet in fluid communication with said inner chamber, a particulate outlet in fluid communication with said outer particulate chamber for discharging particulate from said separation device, a plurality of cyclone separator units each generally mounted between said inner housing and said intermediate housing for separating said particulate-laden gas into particulate and cleaned gas and establishing a pressure in said intermediate chamber greater than the pressure within said particulate chamber, the improvement comprising:
   passage means between the lower portion of said intermediate particulate-laden gas chamber and said particulate outlet for passing particulate from said intermediate chamber to said particulate outlet;
   said particulate outlet comprising a particulate flow chamber structurally arranged for receiving a lower portion of said passage means; and
   said lower portion of said passage means structurally arranged with respect to said particulater flow chamber to reduce pressure in said particulate flow chamber and thereby prevent gas flow from said lower portion of said passage means into said particulate chamber.

2. A separation device as defined in claim 1, wherein said passage means comprises:
   a tubular member having a first open end connected to said lower portion of said intermediate chamber and a second open end positioned within said particulate flow chamber; and
   said particulate outlet comprising a generally cylindrical particulate flow chamber.

3. A separation device as defined in claim 2, further comprising:
   positioning means affixed in said tubular member and adapted for sliding engagement with said particulate outlet for positioning said second open end of said tubular member relative to said particulate flow chamber.

4. A separation device as defined in claim 3, further comprising:
   said positioning means including a plurality of positioning blades affixed to said tubular member and extending radially from said tubular member; and
   guide means adjacent the periphery of said cylindrical particulate flow chamber and structurally arranged for sliding engagement with said positioning blades.

5. A separation device as defined in claim 1, further comprising:
   said inner housing having a generally cylindrical configuration with a substantially vertical inner housing axis; and
   said intermediate housing having a generally cylindrical configuration with a substantial vertical intermediate housing axis aligned with said inner housing axis.

6. A separation device as defined in claim 5, said particulate outlet comprising a generally cylindrical particulate flow chamber with a substantially vertical particulate flow axis generally aligned with said intermediate housing axis.

7. A separation device as defined in claim 1, further comprising:
   thermal insulation material affixed to portions of said particulate housing for minimizing heat loss from said separation device.

8. In a particulate separation device, including a clean gas housing comprising a clean gas chamber, a particulate-laden gas housing comprising a particulate-laden gas chamber, a particulate housing comprising a particulate chamber, a particulate-laden gas inlet adapted to receive a particulate-laden gas and in fluid communication with said particulate-laden gas chamber, a clean gas outlet in fluid communication with said clean gas chamber, a particulate outlet in fluid communication with said particulate chamber for discharging particulate from said separation device, a plurality of cyclone separator units for separating said particulate-laden gas into particulate and cleaned gas and establishing a pressure in said particulate-laden gas chamber greater than the pressure within said particulate chamber, each of said separator units having a separator unit inlet mounted in fluid communication with said particulate-laden gas housing, a separator unit clean gas outlet mounted in fluid communication with said clean gas housing, and a separator unit particulate outlet mounted in fluid communication with said particulate housing, the improvement comprising:
   passage means between the lower portion of said particulate-laden gas chamber and said particulate oulet for passing particulate from said particulate-laden gas chamber to said particulate outlet;
   said particulate outlet comprising a particulate flow chamber structurally arranged for receiving a lower portion of said passage means; and
   said lower portion of said passage means structurally arranged with respect to said particulate flow chamber to reduce pressure in said particulate flow chamber and thereby prevent gas flow from said lower portion of said passage means into said particulate chamber.

9. A separation device as defined in claim 8, wherein said passage means comprises:
   a tubular member having a first open end connected to said lower portion of said particulate-laden gas chamber and a second open end positioned within said particulate flow chamber; and
   said particulate outlet comprising a generally cylindrical particulate flow chamber.

10. A separation device as defined in claim 9, further comprising:
    positioning means affixed to said tubular member and adapted for sliding engagement with said particulate outlet for positioning said second open end of said tubular member relative to said particulate flow chamber.

11. A separation device as defined in claim 10, further comprising:
    said positioning means including a plurality of positioning blades affixed to said tubular member and extending radially from said tubular member; and
    guide means adjacent the periphery of said cylindrical particulate flow chamber and adapted for sliding engagement with said positioning blades.

12. A separation device as defined in claim 9, further comprising:
    said particulate-laden gas housing having a generally cylindrical configuration with a substantial vertical particulate-laden gas housing axis aligned with the axis of said cylindrical particulate flow chamber.

13. A separation device as defined in claim 12, further comprising:
    said clean gas housing having a generally cylindrical configuration with a substantially vertical clean gas housing axis aligned with said particulate-laden gas housing axis.

14. A separation device as defined in claim 8, further comprising:
    thermal insulation material affixed to portions of said particulate housing for minimizing heat loss from said separation device.

* * * * *